United States Patent [19]
Pett

[11] 3,791,619
[45] Feb. 12, 1974

[54] VALVE CONSTRUCTION
[75] Inventor: Alfred W. Pett, Warwick, R.I.
[73] Assignee: New England Union Co., West Warwick, R.I.
[22] Filed: Jan. 31, 1972
[21] Appl. No.: 222,101

[52] U.S. Cl.................. 251/45, 251/43, 251/30, 138/43
[51] Int. Cl.................. F16k 31/385, F16k 31/40
[58] Field of Search.................. 251/45, 44; 138/43

[56] References Cited
UNITED STATES PATENTS

| | | | |
|---|---|---|---|
| 2,235,304 | 3/1941 | Toussant | 251/45 |
| 1,813,979 | 7/1931 | West | 138/43 |
| 2,387,225 | 10/1945 | Beekley | 251/45 |
| 2,568,123 | 9/1951 | Goldberg | 138/43 |
| 3,495,804 | 2/1970 | Müller et al. | 251/45 X |
| 3,369,565 | 2/1968 | Haggard, Jr. | 251/45 X |

Primary Examiner—Arnold Rosenthal
Attorney, Agent, or Firm—Salter & Michaelson

[57] ABSTRACT

A solenoid operated valve construction for controlling flow of a fluid therethrough and including a diaphragm assembly, the movement of which is responsive to a pressure differential thereacross, means being associated with the diaphragm assembly for producing a change in the differential pressure thereacross at a controlled rate, wherein the kinetic energy of the fluid in the pipes interconnected to the valve construction is effectively absorbed, thereby preventing damage to the system and at least preventing the occurrence of water-hammer on the system.

7 Claims, 5 Drawing Figures

PATENTED FEB 12 1974  3,791,619
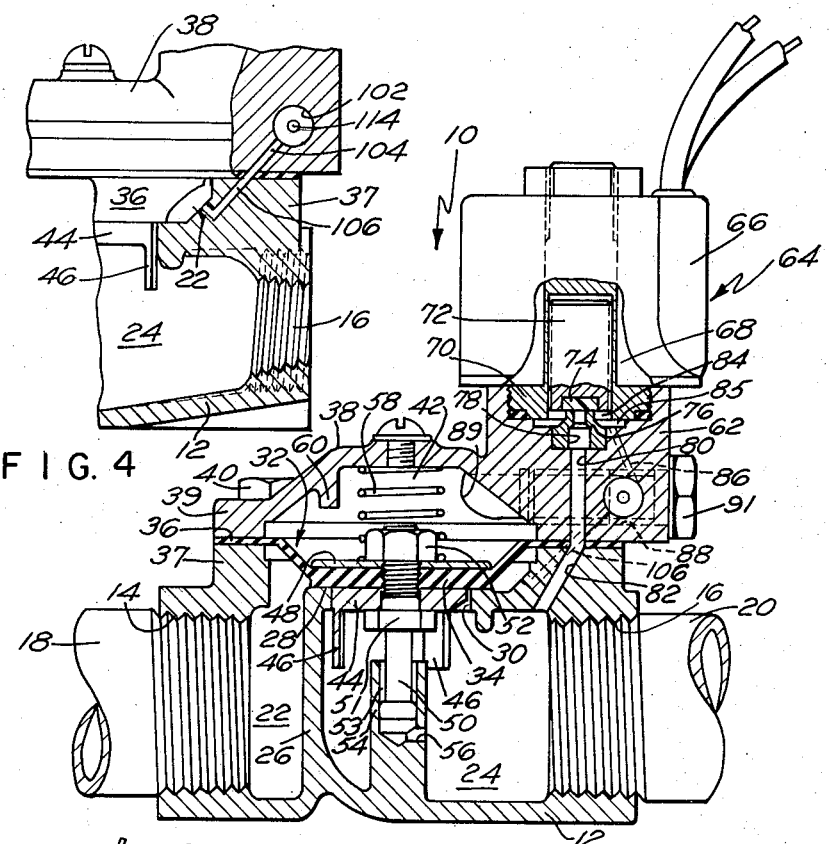
FIG. 4
FIG. 1
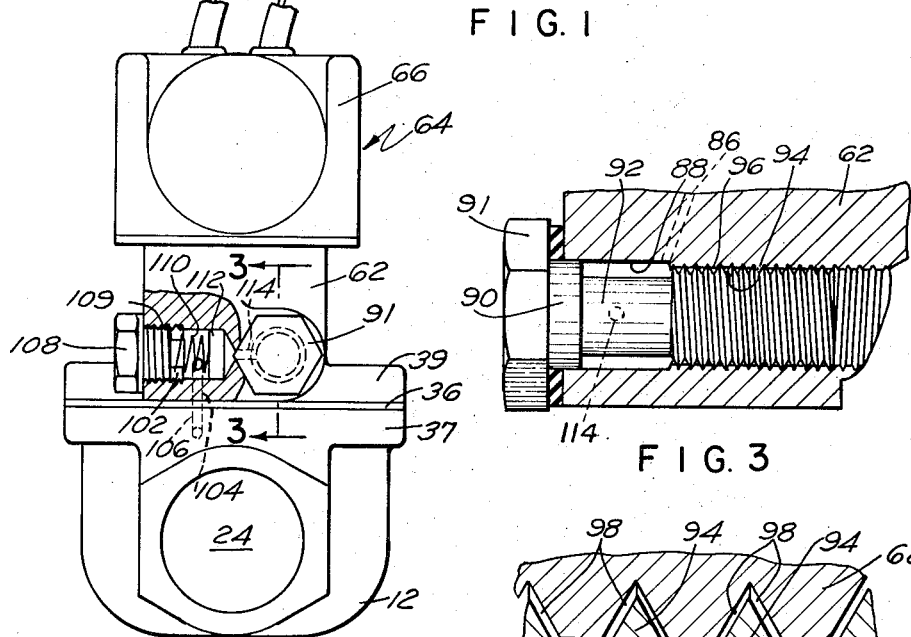
FIG. 2
FIG. 3
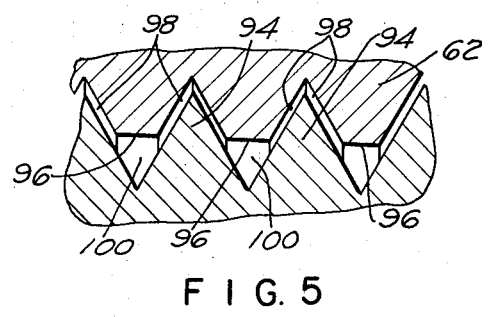
FIG. 5

VALVE CONSTRUCTION

BACKGROUND OF THE INVENTION

The present invention relates to solenoid operated valves, and has particular application in a remotely controlled valve, wherein the valve is either closed or in a fully opened position such as in an electrically operated lawn-sprinkler system. Prior to the instant invention remote controlled solenoid valves were moved to a closed position by energizing the solenoid in the valve which ultimately caused the valve element to close on its seat. When the valve was open with fluid flowing therethrough, the moving column of fluid in the pipe upstream of the valve, developed considerable kinetic energy therein, due to the mass and velocity of the column of fluid. If the valve was not closed slowly, the kinetic energy could not be absorbed quickly enough, and this often times resulted in the damage to the system and was at least evident in noise in the system known as water-hammer.

Some attempts have been made heretofore to slow down the closing action of solenoid operated valves by limiting the rate of fluid flow into the chamber over the valve diaphragm, and some of these prior devices have included flow-restricting means that were located in the valve in such a manner that complete disassembly of the entire valve was required for servicing the part, which was both laborious and costly. Other solenoid operated valves included systems that provided for the the forming of small holes in the valve body leading to the diaphragm chamber, which holes were intended to serve as flow-restricting means; but these holes were difficult to keep clear and cleaning thereof usually required special tooling for disassembly of the unit. Other similar devices that were designed to absorb kinetic energy in a fluid system were relatively complicated and were difficult to maintain in the field, and as a result were prohibitive in cost.

SUMMARY OF THE INVENTION

The present invention relates to a valve construction for use in controlling flow of a fluid through a piping system, and has particular application in a solenoid operated valve which is remotely operated and includes a diaphragm valve assembly that is movable to a fully open or closed position. In order to effectively absorb the kinetic energy that is present in a fluid system upon closing of a valve in the system, the present invention provides a valve construction having a diaphragm valve assembly wherein fluid behind the diaphragm valve assembly is slowly released therefrom so that the pressure differential across the diaphragm is changed slowly. For this purpose, a pilot valve is provided that is responsive to energizing of the solenoid and that communicates directly with the outlet of the valve unit. The pilot valve also communicates with a primary fluid control chamber, that has a restricted passage formed therein, the restricted passage communicating with an interior chamber located behind the diaphragm. A secondary fluid control chamber communicates through a passage with the inlet side of the main valve unit and beneath the diaphragm, the secondary chamber also communicating with the primary chamber. When the solenoid operated pilot valve is energized, communication is established between the interior chamber and the outlet chamber of the main valve unit to withdraw fluid from the interior chamber, thereby decreasing the pressure on the upperside of the diaphragm which causes it to move to an open position. When the solenoid is deenergized, the pilot valve closes and a slow build-up of pressure in the interior chamber occurs as fluid is bled thereto by way of the secondary and primary chambers. As the pressure differential across the diaphragm increases, the diaphragm assembly is slowly moved to a closed position.

Accordingly, it is the object of the invention to provide a solenoid operated valve construction, wherein the closing rate of a diaphragm valve is controlled by the fluid passing through the valve unit and the diaphragm valve is slowly moved to the closed position in response to control of the fluid passing through the valve unit.

Another object of the invention is to provide a relatively simple construction for controlling the closing rate of a solenoid-operated valve.

Still another object is to provide a solenoid-operated valve construction having a fluid control system that is readily disassembled without the use of special tools for the maintenance thereof.

Still another object is to provide a valve construction that includes a solenoid-operated pilot valve that acts to control the flow of fluid to and from the interior diaphragm chamber for controlling the flow of fluid through the valve unit.

Other objects, features, and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1, is a vertical sectional view with parts shown in elevation of the valve construction embodied in the present invention;

FIG. 2, is an end elevational view with parts shown in section of the valve construction looking to the left, as seen in FIG. 1;

FIG. 3, is a sectional view taken along line 3—3 in FIG. 2;

FIG. 4, is an enlarged fragmentary sectional view of a portion of the valve construction illustrated in FIG. 1, showing the passages that communicate with the valve unit inlet chamber and the secondary control chamber; and FIG. 5, is an enlarged fragmentary illustration of the restricted passage as formed by the threaded members in the primary fluid control chamber.

DESCRIPTION OF THE INVENTION

Referring now to the drawing, and particularly to FIG. 1, the valve construction embodied in the present invention is illustrated and is generally indicated at 10. As presently contemplated, the valve construction 10 is intended for use in a lawn sprinkler system, although the concept of the invention as embodied herein is intended for use in any fluid system, that requires an arrangement for preventing too rapid closing of a remotely controlled valve.

The valve construction 10 includes a body portion 12 that defines the main valve unit and has an inlet port 14 and an outlet port 16 formed therein on opposite sides thereof. The inlet port 14 and outlet port 16 are both suitably internally threaded for receiving an inlet pipe 18 and an outlet pipe 20, respectively, therein. Formed in the body portion 12 and communicating with the inlet port 14, is an inlet chamber 22, while an outlet chamber 24 is formed in the opposite portion of body portion 12 and communicates with the outlet port 16. An interior wall 26 separates the inlet chamber 22 from the outlet chamber 24, and joined to the upper end of the wall 26 is a seat 28 in which an opening 30 is formed that normally provides communication between the inlet chamber 22 and the outlet chamber 24.

Mounted within the body portion 12 for movement is a diaphragm valve assembly generally indicated at 32, that includes a seat portion 34 that is engageable with the seat 28 for sealing the opening 30 through which fluid passes from the inlet chamber 22 to the outlet chamber 24. Integrally joined to the seat portion 34 of the diaphragm valve assembly is a flexible membrane 36 that is secured between a flange 37 joined to the body portion 12 and a flange 39 formed on a cap portion 38 that is mounted on the body portion 12 in fixed relation by cap screws 40. The cap portion 38 has a crown configuration as indicated in FIG. 1, to define an interior diaphragm chamber 42 that is formed between the upper portion of the diaphragm valve assembly 32 and the underside of the cap portion 38. The diaphragm valve assembly 32 is mounted for vertical axial movement and for this purpose includes a seat guide 44 formed with spaced downwardly projecting extensions 46 on the underside thereof that project through the opening 30. Located on the upper side of the diaphragm seat 34 is a plate 48 through which a threaded section of stem 50 projects. A nut 52 mounted on the upper end of the threaded section of the stem 50 engages the plate 50 and cooperates with a flange 51 that abuts the underside of the guide 44 to secure the seat portion 34, seat guide 44 and plate 48 to the stem 50 as a unit. The lower portion of the stem 50 projects into a hole 53 formed in a stem guide 54, the stem guide 54 being formed as an integral part of the body portion 12 and being located in the outlet chamber 24. A vent hole 56 is formed in the stem guide 54 and communicates with the hole 53 formed therein and provides for flushing out of any debris or sediment that may have collected in the hole 53.

Located in the diaphragm chamber 42 and engaging the upper side of the diaphragm plate 48 is a spring 58, the upper end of which engages the inside of the top wall of the cap portion 38. The spring 58 urges the seat portion 34 of the diaphragm valve assembly 32 toward the closed position thereof, wherein the seat portion 34 is located in contact with the seat 28. A plurality of inwardly projecting bosses 60 are formed interiorly of the cap portion 38 and act to limit movement of the diaphragm valve assembly 32 in the upper position thereof, thereby protecting the membrane 36 of the diaphragm valve assembly against undue flexing movement in the open position of the valve unit.

Mounted on an upwardly extending boss 62 that is formed as an integral part of the cap portion 38 is a solenoid assembly generally indicated at 64. The solenoid assembly 64 includes a housing 66 in which a solenoid coil 68 is located. A sleeve 70 is threadably secured in the boss 62 and projects through the coil 60 and has an interior opening formed therein in which an armature 72 is located. Secured in the armature 72 at the lower end thereof is a pilot valve 74 that is engageable with the upper end of a seat 76, the seat 76 being mounted in the boss 62 below the sleeve 70. Formed in the pilot valve seat 76 is an opening 78 that communicates with a passage 80 that extends through the cap portion 38 to the lower end thereof. As illustrated in FIG. 1, a diagonally extending passage 82 is formed in the flange 37 of the body portion 12 and provides communication between the passage 80 and the outlet chamber 24. Located exteriorly of the pilot valve seat 76 and below the pilot valve 74 is a chamber 84 that communicates with an interior passage 85 that also communicates with a primary control chamber 88.

As shown in FIG. 3, the chamber 88 is formed in the cap portion 38 below the boss 62, the axis thereof being generally horizontal and the innermost end thereof communicating with the diaphragm chamber 42 by way of an opening 89. A restrictor member 90 having a head 91 formed thereon projects into the chamber 88 and is formed with a stem 92 on the end of which a plurality of male threads 94 are formed. The interior of the chamber 88 is formed with female threads, which, as illustrated in FIG. 5 have a flat-tooth configuration 96 as seen in cross section. With the restrictor member 90 located in the chamber 88, a restricted passage 98 is formed between the walls of the female threads 96 and the male threads 94, while a passage 100 having a substantially triangular configuration in cross section is formed between the flat portion 96 of the female threads and the adjacent portion of the male threads 94. It is understood that the dimensions of the passage 100 can be varied by changing the dimension of the flat portion 96 formed on the female threads in the passage 88, thereby affecting the flow rate of fluid through the passage and into and out of the diaphragm chamber 42. Since fluid passing through the passage 100 affects the closing rate of the diaphragm assembly 32, the optimum dimension of this passage is such as to produce a flow rate of fluid therethrough that will effect a closing of the diaphragm assembly 32 without damage or noise due to water-hammer resulting in the piping system associated with the valve construction.

In order to effectively control the closing rate of the diaphragm assembly 32 it is necessary to provide communication between the chamber 88 and the inlet chamber 22, and for this purpose a secondary control chamber 102 indicated in FIG. 4 is provided. As illustrated in FIG. 4, a passage 104 communicates with the interior of the secondary chamber 102, and also communicates with the inlet chamber 22 through an obliquely extending passage 106 that is formed in the flange 37 of the body portion 12. As illustrated in FIG. 2, a plug member 108 projects into the secondary chamber 102 and is formed with a head thereon that limits inward movement into the chamber 102. The plug member 108 has a threaded shank 109 that is threadedly received in the chamber 102, a spring 110 engaging the shank 109 and having a screen 112 mounted on the end thereof. Formed in the cap portion 38 and providing communication between the secondary chamber and the bleed chamber 88 is a short passage 114, the short passage 114 extending axially of the chamber 102 and through a side wall of the chamber 88. The screen 112 is located adjacent to the passage 114 and provides protection therefor against accumulation of sediment or debris therein. It is seen that the secondary chamber 102 provides communication between the inlet chamber 22 and the chamber 88 by way of the passages 104 and 106, and the short passage 114.

OPERATION

It is first assumed that the valve unit is in the open position thereof and fluid is flowing through the inlet pipe 18 into chamber 22 and then into chamber 24 by way of the opening 30. With the valve unit in the open position as described, fluid is normally flowing through passages 106 and 104 into the secondary control 102, and through the passage 114 into the primary control chamber 88. Since the valve unit is open, the solenoid 64 is energized and fluid also flows through the passage 86, chamber 84, through the open pilot valve into passages 78, 80 and 82, and then into the outlet chamber 24. With the solenoid 64 energized, the fluid in the diaphragm chamber 42 exhausts to a lower pressure zone by way of passages 100, 86, 80 and 82. It is seen that the pressure in the chamber 88 is less than that in inlet chamber 22, but greater than that in the outlet chamber 24, and consequently the pressure in the diaphragm chamber 42 is substantially the same as that in the chamber 88. Thus the greater pressure in the inlet chamber 22 maintains the diaphragm valve assembly 32 in the open position thereof. The pressure in the inlet chamber 22 also over-balances whatever force may be exerted by the spring 58 and the inherent resistance to flexure of the membrane 36 of the diaphragm assembly.

The valve construction is closed by sealing communication between the chambers 22 and 24, and this is accomplished by deenergizing the solenoid 64 to move the pilot valve 74 to the closed position on the seat 76. Since communication between the chamber 88 and outlet chamber 24 is closed by the pilot valve 74, the pressure in the chamber 88 reaches the pressure in the inlet chamber 22. Since the pressure in chamber 88 is somewhat higher than the pressure in the diaphragm chamber 42, fluid flows through the restricted passage 100 to increase the pressure in the diaphragm chamber 42. This causes the diaphragm assembly to begin moving to the closed position and the pressure in the diaphragm chamber 42 now approaches the pressure in the inlet chamber 22. Since the pressure in the outlet chamber 24 begins to reduce with respect to the pressure in the inlet chamber 22 and the diaphragm chamber 42, the diaphragm valve assembly 32 continues to close. However, due to the restricted flow of the fluid passing through the passage 100 into the chamber 42, the diaphragm valve assembly 32 moves slowly to the closed position thereof.

With the diaphragm valve assembly 32 in the closed position thereof, the pressure on both sides of the flexing portion of the diaphragm valve assembly is the inlet or supply pressure, wherein undue strain is not imposed on the flexing portions of the diaphragm valve assembly membrane 36 with the valve construction in the closed position thereof. In this position, the spring 58 further aids in holding the diaphragm valve assembly in the closed position. In order to move the valve construction to the open position, the solenoid 64 is energized which causes the pilot valve 74 to lift off of the seat 76. This permits flow of fluid from chamber 88 through the passages 86, 80 and 82 to the outlet chamber 24. By providing communication between the chamber 88 and the outlet chamber 24, the pressure in the chamber 88 is reduced and the flow of fluid is induced from the diaphragm chamber 42 into the chamber 88 by way of the restricted passage 100. The pressure above the diaphragm valve assembly 32 decreases and the seat portion 34 of the diaphragm valve assembly moves away from the seat 28. Pressure in the outlet chamber 24 builds up and the diaphragm valve assembly reaches a balanced open position. When pressure on the underside of the diaphragm valve assembly 32 builds up to move the diaphragm valve assembly to the fully open position, the bosses 60 will be engaged and will resist further upward movement of the diaphragm valve assembly. Due to the restricted flow rate of the fluid as it passes from the diaphragm chamber 42 into the chamber 88, the diaphragm valve assembly 32 will open slowly.

Although the operation of the valve construction as described hereinabove sets forth that the diaphragm valve assembly 32 slowly moves to and from the open and closed positions, it is contemplated that a fast-opening-slow-closing operation can be provided without appreciably changing the structure. In this event, the chamber 84 would be connected directly to the diaphragm chamber 42, in which case the restricted passage 100 and chamber 88 would be by-passed. Continuous flow of fluid would occur when the diaphragm valve assembly 32 is opened by way of the passage 100. In the previous description wherein the valve construction has a slow-opening-slow-closing operation the volume of fluid flowing through the passage 100 is limited on closing to that required to close the diaphragm assembly 32. On opening this same volume of fluid is again directed back through the restricted passage 100.

It is seen that the valve construction as embodied herein is simple to operate by merely energizing of the solenoid 64. The valve system is amply protected by the slow closing of the diaphragm assembly 32 and since the chambers 88 and 102 are externally accessible by way of the members 90 and 108, maintenance of the unit is relatively simple. The major portion of any debris will collect in the chamber 88, and this can be readily cleaned by removing the member 90. The external threaded portion 94 can be wiped clean, while the interior threads 96 can also be suitably cleaned with little difficulty.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve construction for controlling flow of a fluid therethrough comprising a body portion to which an inlet pipe and an outlet pipe are connected, an inlet chamber communicating with said inlet pipe and an outlet chamber communicating with said outlet pipe, a movable diaphragm located in said body portion and normally sealing communication between said inlet and outlet chambers, an interior chamber formed in said body portion between said diaphragm and a wall of said body portion, an interior pilot valve located in said body portion and that is operable to induce flow of fluid to and from said interior chamber for controlling the pressure differential across said diaphragm wherein the diaphragm is flexed in accordance with the pressure differential thereacross to control communication between said inlet and outlet chambers, and means communicating with said inlet chamber and said interior chamber for restricting flow of fluid to and from said interior chamber so as to prevent too rapid closing of said diaphragm and thereby preventing waterhammer from occurring in said pipes, said flow restricting means including an elongated cylindrical control chamber that directly communicates with said pilot valve and in which a restrictor member is located, said restrictor member cooperating with the interior of said control chamber to define a spirally extending restricted passage for restricting flow of fluid therethrough, wherein flow of fluid to and from said interior chamber is restricted to produce gradual changes in the differential pressure across said diaphragm, said flow restricting means further including a cylindrical secondary chamber, the longitudinal axis of which is perpendicular to the longitudinal axis of said control chamber, said secondary chamber having an end wall that is located adjacent to and forming a part of a wall of said control chamber, an orifice that is restricted relative to said control and secondary chambers extending through the end wall of said secondary chamber for communication with said control chamber to provide for direct communication between said secondary and control chambers and for restricted flow of fluid from said secondary chamber to said control chamber, said secondary chamber directly communicating with said inlet chamber, wherein restricted flow of fluid from said inlet chamber to said control chamber and to said interior chamber is provided for supplying line pressure therein, thereby locating the diaphragm in the closed position thereof.

2. A valve construction as set forth in claim 1, said fluid inducing means further including a passage formed in said body portion that communicates directly with said outlet chamber, said pilot valve controlling communication between said passage and said flow restricting means.

3. A valve construction as set forth in claim 1, an interior passage interconnecting said pilot valve to said control chamber, wherein direct communication between said control chamber and outlet chamber is provided when said pilot valve is moved to the open position thereof, thereby reducing the pressure in said interior chamber with respect to the pressure in said inlet chamber, to cause the diaphragm to move to the open position 4. A valve construction as set forth in claim 1, a screen located in said secondary chamber and adjacent to said restricted orifice for screening the fluid passing therethrough.

5. A valve construction as set forth in claim 1, the spirally extending restricted passage in said control chamber being formed by an internally threaded portion formed in the walls thereof, a restrictor member located in said control chamber and having a shank which includes an externally threaded portion formed thereon, said shank being threadably received in the internally threaded portion of the walls of said control chamber.

6. A valve construction as set forth in claim 5, one of the threaded portions that define said restricted passage in said control chamber including threads that have a flat tooth configuration, wherein the threads of the other threaded portion and the threads that are formed with the flat tooth configuration define said restricted passage therebetween which in cross section is substantially triangular.

7. A valve construction as set forth in claim 6, the threads that define the threaded portion as formed in the walls of the control chamber having the flat tooth configuration.

* * * * *